United States Patent Office 2,766,216
Patented Oct. 9, 1956

2,766,216

HYDROXY COMPOUNDS FROM 2,3,4,5-BIS-(DELTA²-BUTENYLENE) TETRAHYDROFURFURYL ALCOHOL AND ALKYL DERIVATIVES THEREOF AND THEIR USE AS PLASTICIZERS

John C. Hillyer, Bartlesville, Okla., assignor to Phillips Petroleum Company, a corporation of Delaware No Drawing. Application August 19, 1952,
Serial No. 305,286

14 Claims. (Cl. 260—30.4)

This invention relates to hydroxylated derivatives of 2,3,4,5-bis (delta²-butenylene) tetrahydrofurfuryl alcohol and of alkyl derivatives thereof. In one aspect, it relates to a method for preparing said hydroxylated derivatives. In another aspect, it relates to new compositions of matter useful as plasticizers for synthetic rubber and plastics. In another aspect it relates to a novel rubber composition.

According to this invention, new compositions of matter are prepared by hydroxylation of 2,3,4,5-bis(delta²-butenylene) tetrahydrofurfuryl alcohol, and alkyl derivatives thereof with hydrogen peroxide in the presence of formic acid or a selected lower alkyl ester of formic acid. The alcohol compound is reacted so that either of the two double bonds present in the molecule or both bonds are hydroxylated, two hydroxy groups being added to each double bond reacted.

The 2,3,4,5-bis(delta²-butenylene) tetrahydrofurfuryl alcohol and the alkyl derivatives from which the hydroxy compounds of this invention are derived are represented by the formula

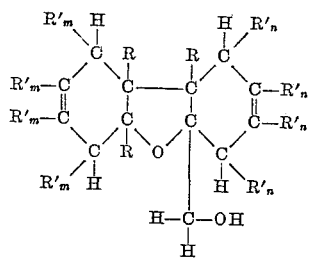

where R is selected from the group consisting of hydrogen and methyl and at least one R is hydrogen; each R' is selected from the group consisting of hydrogen and an alkyl group having not more than three carbon atoms; the sum of the carbon atoms in the R'$_m$ groups is less than four; the sum of the carbon atoms in the R'$_n$ group is less than four; and at least two of the R'$_m$ and two of the R'$_n$ groups are hydrogen. The 2,3,4,5-bis(delta²-butenylene) tetrahydrofurfural and the alkyl derivatives thereof are described, and the preparation is set forth, by Hillyer and Nicewander, Ind. Eng. Chem. 40, 2216 (1948) and application Serial No. 81,413, filed March 14, 1949, now U. S. Patent 2,683,151. The corresponding alcohols can be prepared from 2,3,4,5-bis(delta²-butenylene) tetrahydrofurfural by reduction of the aldehydic group.

The term "alkyl," as used herein means an organic radical having the general formula $C_nH_{2n+1}$—.

The following are formulae of specific starting materials that can be hydroxylated according to this invention:

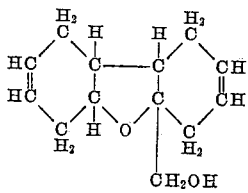

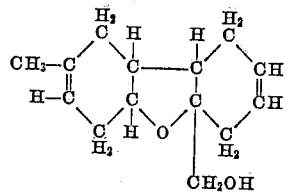

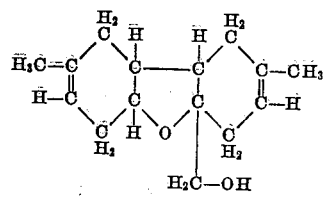

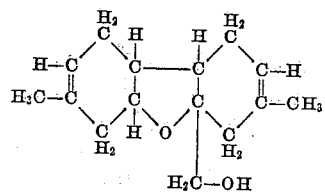

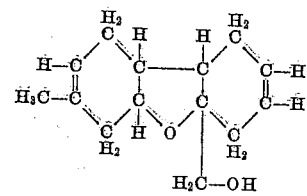

Those skilled in the art will recognize that the non-alkylated compounds illustrated by formula are obtainable by condensing furfural with butadiene, that dimethylated compounds are obtainable from furfural and isoprene, and that monomethylated compounds are obtainable from butadiene, isoprene, and furfural, the condensation product being reduced to produce the alcohol.

Additional examples of starting materials are:

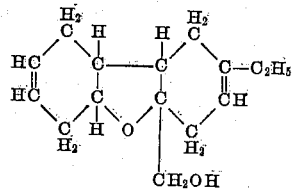

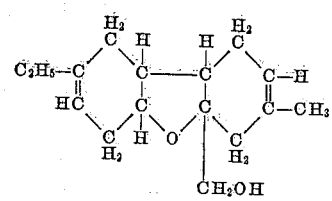

Hydroxy compounds prepared from the above-described compounds according to this invention are represented by the formulae

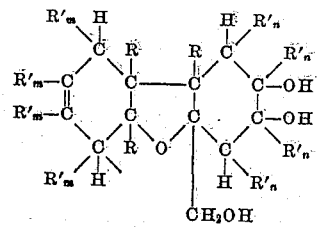

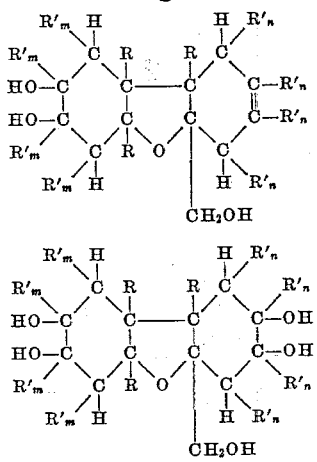

Examples of specific products are:

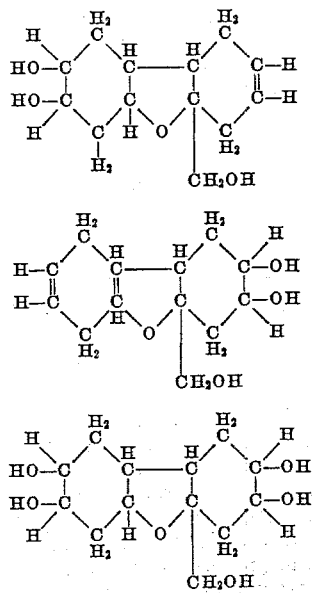

The alkyl derivatives of the above-mentioned specific products are also obtainable, according to this invention, as indicated supra.

When operating according to the process of this invention the 2,3,4,5-bis(delta$^2$-butenylene) tetrahydrofurfuryl alcohol or alkyl derivative of the alcohol is charged to a reactor together with an aqueous solution of hydrogen peroxide and the desired quantity of formic acid. The reactor is provided with an agitating means and a condenser system. The reaction mixture is held at a temperature in the range from 10 to 95° C., preferably from 20 to 60° C. The time of reaction depends on the temperature employed and the degree of hydroxylation desired, that is, whether one or both olefinic bonds are to be hydroxylated. The reaction time is generally in the range from one to 60 hours and preferably in the range from 6 to 30 hours. Hydroxylation is frequently effected at atmospheric pressure and satisfactory results are obtained when operating in this manner. However, when low-boiling catalysts such as methyl formate are used, it is desirable to carry out the reaction at a pressure sufficient to maintain the reaction system in liquid phase at the temperature employed.

After the first step in the reaction has been carried out, the mixture is maintained for a time in the range 15 minutes to 30 hours at a temperature in the range 10° C. to the refluxing temperature, and is preferably refluxed for a period ranging from 15 minutes to 4 or 5 hours to decompose any hydrogen peroxide or performic acid (in cases where formic acid has been used as the catalyst) remaining in the system. The water present is removed by heating in vacuo. A large excess of methanol is then added to react with any formic acid present, the mixture is heated to around 40 to 50° C., and the methanol and any low-boiling ester removed by heating in vacuo. The material which remains as distillation residue is the hydroxylated 2,3,4,5-bis(delta$^2$-butenylene) tetrahydrofurfuryl alcohol.

In place of hydrogen peroxide, materials capable of yielding hydrogen peroxide can be used. The hydrogen peroxide is preferably utilized in aqueous solution of a concentration in the range from 3 to 90 weight per cent and preferably in the range from 5 to 40 weight per cent. The amount of hydrogen peroxide employed is generally in the range from 0.2 to 4 moles, preferably 0.5 to 3 moles, per mole of the 2,3,4,5-bis(delta$^2$-butenylene) tetrahydrofurfuryl alcohol.

Catalysts suitable for the hydroxylation reaction of this invention preferably include formic acid and lower alkyl esters thereof, for example, methyl formate, ethyl formate, and propyl formate; however, other hydroxylating catalysts can be used and are within the scope of the invention. The catalysts are preferably utilized in equimolar proportions with the hydrogen peroxide; however, mol ratios of catalyst to hydrogen peroxide in the range from 0.2 to 1 to 2:1 can be used.

The hydroxylated derivatives of 2,3,4,5-bis(delta$^2$-butenylene) tetrahydrofurfuryl alcohol, and of the alkyl derivatives according to this invention range in color and consistency from yellow, viscous liquids to dark-brown semisolids. They have molecular weights in the range 238 to 386, preferably 238 to 302, carbon contents in the range 55 to 65.5 weight per cent, and hydrogen contents in the range 7.3 to 9.9 weight per cent.

The products per se of this invention can be employed as plasticizers for resins and synthetic or natural rubber or they can be esterified with organic acids, phosphorus-containing esterifying agents, and the like, and the esters employed as plasticizers. The term "synthetic rubber" includes such rubbers as butadiene-acrylonitrile rubber, polybutadiene, butadiene-styrene rubber, etc. Generally, about 5 to 25 weight percent, preferably 10 to 20 percent of hydroxylated product or ester thereof, based on the unplasticized plastic or rubber composition produces the desired effect.

*Example 1*

A starting material for hydroxylation according to this invention was prepared as follows:

The condensation product obtained by reacting two moles of 1,3-butadiene with one mole of furfural was employed for the preparation of 2,3,4,5-bis(delta$^2$-butenylene)tetrahydrofurfuryl alcohol. This condensation product had a boiling point of 110–121° C. at 1.3–2.1 mm. Hg pressure. For the preparation of the alcohol a mixture of 612 grams 2,3,4,5-bis(delta$^2$-butenylene)tetrahydrofurfuryl, 800 ml. methanol, and 300 ml. of 40 percent formaldehyde was added over a 30-minute period to a methanol solution of potassium hydroxide previously prepared by dissolving 500 grams KOH in 750 ml. methanol and cooling the mixture to 50–60° C. The temperature of the reaction mixture was maintained at 58° C. for 4 hours after which one liter of water was added. The aqueous layer was separated from the product layer and the methanol stripped from it under reduced pressure. The material remaining was extracted three times with 400 ml. portions of benzene. The benzene extracts were combined with the product layer, washed five times with 200 ml. portions of water, filtered, and the benzene removed by distillation. The product was distilled and a fraction boiling at 116–132° C. at 1 mm. Hg pressure was employed for hydroxylation.

Hydroxylation of the 2,3,4,5-bis(delta$^2$-butenylene) tetrahydrofurfuryl alcohol was conducted according to the invention as follows:

A reactor, provided with a stirrer and condenser, was charged with 90 grams (0.44 mole) of 2,3,4,5-bis(delta²-butenylene) tetrahydrofurfuryl alcohol, prepared as described above, an aqueous solution of hydrogen peroxide prepared by mixing 183 grams water with 113 grams of 26.5 weight percent hydrogen peroxide (0.88 mole), and 40.6 grams (0.88 mole) of formic acid. The temperature was maintained at 50° C. for 8 hours after which an additional 56 grams of 26.5 weight percent hydrogen peroxide was introduced. The reaction mixture was stirred an additional 12 hours at 50° C. after which approximately 100 ml. of methanol was added. The mixture was then refluxed 30 minutes and the volatile matter removed by vacuum distillation. Toward the end of the distillation the mixture was heated to 50° C. at 4 mm. Hg pressure to remove the last traces of water. The product which remained was a dark straw-colored, sticky, semi-solid material having a hydroxyl number of 635 (representing an average of 3.2 OH groups per molecule), a carbon content of 55.2 weight percent, and a hydrogen content of 7.8 weight percent. The product also had a saponification number of 76 (representing an average of 0.6 OH groups per molecule), indicating that some esterification had taken place. Thus, according to analysis the average number of OH groups per molecule is 3.8.

The actual and the calculated ultimate analyses are shown in the following tabulation:

|  | Found | Calculated |  |
|---|---|---|---|
|  |  | Double Bonds Hydroxylated |  |
|  |  | 1 | 2 |
| Carbon, weight percent | 55.2 | 65 | 57 |
| Hydrogen, weight percent | 7.8 | 8.3 | 8 |

*Example II*

The hydroxylated 2,3,4,5-bis(delta²-butenylene) tetrahydrofurfuryl alcohol prepared as described in Example I was employed as a softener in a 74/26 butadiene-acrylonitrile copolymer prepared by emulsion polymerization. The compounding recipe is given below. A sample of the butadiene-acrylonitrile copolymer was also compounded in a similar manner except that the hydroxylated product was omitted. This latter sample was used as a control. The compounding recipes employed were as follows:

|  | A, Parts by Weight | B (Control), Parts by Weight |
|---|---|---|
| Butadiene-acrylonitrile copolymer | 100 | 100 |
| Philblack A [1] | 60 | 60 |
| Zinc oxide | 5 | 5 |
| Stearic acid | 1.5 | 1.5 |
| Sulfur | 2.0 | 1.5 |
| Altax [2] | 2.0 | 1.5 |
| Hydroxylated product from Example I | 20 | --- |

[1] Medium abrasion furnace black.
[2] Benzothiazyl disulfide.

The samples were cured at 307° F. for 30 minutes and physical properties determined. Swelling tests were made on the cured samples by immersing them in a mixture containing 30 percent toluene and 70 percent isooctane at room temperature (80° F.) for seven days. The percentage of material extracted was determined by both weight and aliquot methods. In the weight method a sample is weighed prior to the swelling test, immersed in the extraction liquid for the requisite period, dried, and weighed again. In the aliquot method the quantity of extracted material is determined by evaporating the immersion liquid at the conclusion of the swelling test, drying the residue in an oven at 220° F. for 30 minutes, and weighing. Results of tests on physical properties were as follows:

|  | A | B (Control) |
|---|---|---|
| Stress-strain properties at 80° F.: |  |  |
| Tensile, p. s. i. | 3,020 | 3,450 |
| Elongation, percent | 290 | 315 |
| Shore hardness | 79 | 73 |
| Compression set, percent | 11.7 | 8.2 |
| Compound MS-1½ at 212° F | 51.5 | 70 |
| Percent swelled [1] | 37.8 | 43.8 |
| Percent extracted [1]: |  |  |
| Weight | 1.1 | 2.3 |
| Aliquot | 1.2 | 1.2 |
| Freeze point, °C., Gehman | −27 | −20 |

[1] 45-minute cure.

The compounded Mooney values show that the hydroxlated product has a softening effect on the butadiene-acrylonitrile rubber and that it is substantially non-extractable. The sample containing the hydroxylated product swelled less than the control.

Variation and modification are possible within the scope of the foregoing specification and the claims to this invention, the essence of which is that new compositions of matter are obtained by hydroxylating a compound selected from the group consisting of 2,3,4,5-bis(delta²-butenylene) tetrahydrofurfuryl alcohol, and alkyl derivatives of the alcohol, with hydrogen peroxide and that a novel rubber composition is provided by incorporating the hydroxylated products into a rubber.

I claim:

1. A process for hydroxylating a compound having the formula

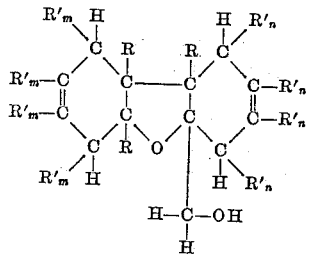

where R is selected from the group consisting of hydrogen and methyl and at least one R is hydrogen; each R′ is selected from the group consisting of hydrogen and an alkyl group having not more than three carbon atoms; the sum of the carbon atoms in the $R'_m$ groups is less than four; the sum of the carbon atoms in the $R'_n$ group is less than four; and at least two of the $R'_m$ and two of the $R'_n$ groups are hydrogen, which process comprises reacting said compound with hydrogen peroxide at a temperature in the range from 10 to 95° C., and a pressure sufficient to maintain liquid phase conditions, for a time in the range from 1 to 60 hours, in the presence of a catalyst selected from the group consisting of formic acid and the lower alkyl esters thereof, and recovering a product wherein at least one of the double bonds in said formula has been saturated by the introduction of at least two hydroxyl groups into the molecule.

2. A process for producing a hydroxylated derivative of a compound having the formula

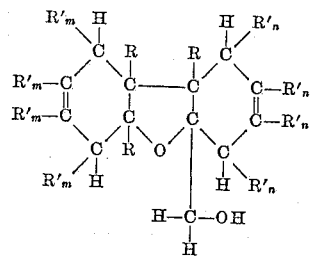

where R is selected from the group consisting of hydrogen and methyl and at least one R is hydrogen; each R′ is selected from the group consisting of hydrogen and an alkyl group having not more than three carbon atoms;

the sum of the carbon atoms in the R'n groups is less than four; the sum of the carbon atoms in the R'm group is less than four; and at least two of the R'm and two of the R'n groups are hydrogen, which process comprises reacting said compound with hydrogen peroxide in the presence of a catalyst selected from the group consisting of formic acid and the lower alkyl esters thereof at a temperature in the range 10 to 95° C., a molar ratio of hydrogen peroxide to said compound in the range from 0.2:1 to 4:1, and a pressure sufficient to maintain the reactants and the catalyst substantially in the liquid phase, for a reaction time in the range 1 to 60 hours, the molar ratio of catalyst to hydrogen peroxide being in the range 0.2:1 to 2:1, and recovering a product wherein at least one of the double bonds in said formula has been saturated by the introduction of at least two hydroxyl groups into the molecule.

3. The process of claim 2 in which said compound is 2,3,4,5-bis(delta²-butenylene) tetrahydrofurfuryl alcohol.

4. The process of claim 2 in which said compound has the formula:

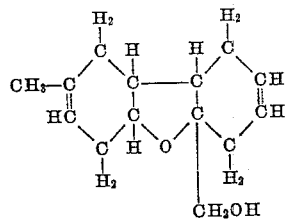

5. The process of claim 2 in which said compound is represented by the formula:

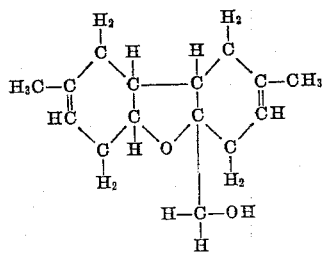

6. The process of claim 2 in which said compound is represented by the formula:

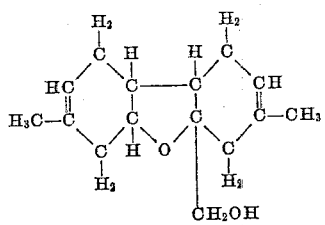

7. The process of claim 2 in which the temperature is in the range 20 to 60° C., the time is in the range 6 to 30 hours, the catalyst is formic acid; and after said reaction time, the reaction mixture is refluxed for a time in the range 15 minutes to 5 hours, water is removed by heating in vacuo, the formic acid is esterified with methanol, methyl formate and methanol are removed by heating in vacuo, and said product is recovered from the residue.

8. The process of claim 2 in which the hydrogen peroxide is a 3 to 90 weight percent aqueous solution of hydrogen peroxide.

9. The process of claim 2 in which the molar ratio of hydrogen peroxide to said compound is in the range from 0.5:1 to 3:1 and the molar ratio of catalyst to hydrogen peroxide is 1:1.

10. A composition of matter produced by hydroxylating a compound having the formula

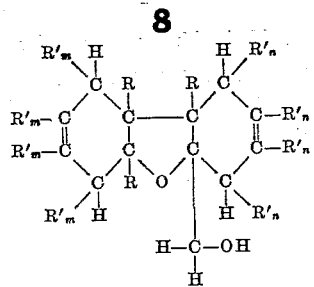

where R is selected from the group consisting of hydrogen and methyl and at least one R is hydrogen; each R' is selected from the group consisting of hydrogen and an alkyl group having not more than three carbon atoms; the sum of the carbon atoms in the R'm groups is less than four; the sum of the carbon atoms in the R'n group is less than four; and at least two of the R'm and two of the R'n groups are hydrogen, which comprises reacting said compound with hydrogen peroxide in the presence of a catalyst selected from the group consisting of formic acid and the lower alkyl esters thereof for a time sufficient to increase the hydroxyl number of said compound.

11. A rubber composition comprising a rubber selected from the group consisting of synthetic and natural rubbers, said composition containing from 5 to 25 weight percent of an hydroxylated compound produced by hydroxylating a compound having the formula

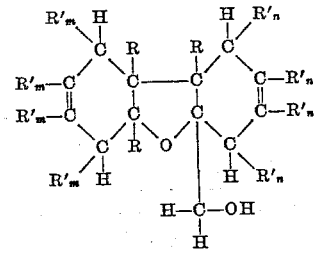

where R is selected from the group consisting of hydrogen and methyl and at least one R is hydrogen; each R' is selected from the group consisting of hydrogen and an alkyl group having not more than three carbon atoms; the sum of the carbon atoms in the R'm groups is less than four; the sum of the carbon atoms in the R'n group is less than four; and at least two of the R'm and two of the R'n groups are hydrogen, which comprises reacting said compound with hydrogen peroxide in the presence of a catalyst selected from the group consisting of formic acid and the lower alkyl esters thereof for a time sufficient to increase the hydroxyl number of said compound.

12. A process for hydroxylating a compound represented by the general formula

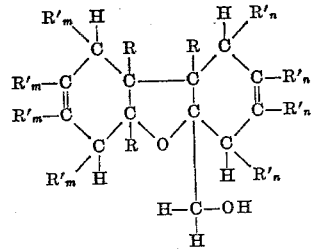

where R is selected from the group consisting of hydrogen and methyl and at least one R is hydrogen; each R' is selected from the group consisting of hydrogen and an alkyl group having not more than three carbon atoms; the sum of the carbon atoms in the R'm groups is less than four; the sum of the carbon atoms in the R'n group is less than four; and at least two of the R'm and two of the R'n groups are hydrogen, which process comprises reacting said compound with hydrogen peroxide in the presence of a catalyst selected from the group consisting of formic acid and the lower alkyl esters thereof for a time sufficient to increase the hydroxyl number of said compound so that two hydroxyl groups are introduced to at least one of the double bonds of said compound, and recovering a hydroxylated product.

13. The process of claim 14 wherein the reaction time is in the range from about 1 to about 60 hours.

14. A process for hydroxylating a compound represented by the general formula

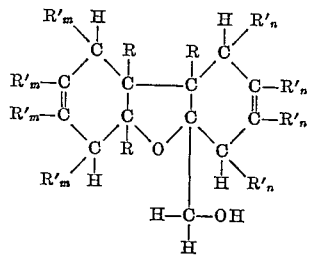

where R is selected from the group consisting of hydrogen and methyl and at least one R is hydrogen; each R' is selected from the group consisting of hydrogen and an alkyl group having not more than three carbon atoms; the sum of the carbon atoms in the $R'_m$ group is less than four; the sum of the carbon atoms in the $R'_n$ group is less than four; and at least two of the $R'_m$ and two of the $R'_n$ groups are hydrogen, which process comprises reacting said compound with hydrogen peroxide in the presence of a catalyst selected from the group consisting of formic acid and the lower alkyl esters thereof at a temperature in the range from about 10° C. to about 95° C. such that the hydroxyl number of said compound is increased by the introduction of two hydroxyl groups to at least one of the double bonds of said compound, and recovering a hydroxylated product.

References Cited in the file of this patent
UNITED STATES PATENTS
2,325,948    Garvey ------------------ Aug. 3, 1943